United States Patent
Yoo et al.

(10) Patent No.: US 11,347,897 B2
(45) Date of Patent: May 31, 2022

(54) ELECTRONIC DEVICE AND METHOD FOR TRANSMITTING AND RECEIVING DATA ON THE BASIS OF SECURITY OPERATING SYSTEM IN ELECTRONIC DEVICE

(71) Applicant: Samsung Electronics Co., Ltd., Gyeonggi-do (KR)

(72) Inventors: Jaesung Yoo, Gyeonggi-do (KR); Girim Son, Gyeonggi-do (KR); Hyungchul Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 16/764,608

(22) PCT Filed: Nov. 19, 2018

(86) PCT No.: PCT/KR2018/014205
§ 371 (c)(1),
(2) Date: May 15, 2020

(87) PCT Pub. No.: WO2019/098790
PCT Pub. Date: May 23, 2019

(65) Prior Publication Data
US 2020/0396080 A1    Dec. 17, 2020

(30) Foreign Application Priority Data
Nov. 20, 2017   (KR) .................... 10-2017-0154918

(51) Int. Cl.
*G06F 21/74*   (2013.01)
*G06F 21/72*   (2013.01)
(Continued)

(52) U.S. Cl.
CPC ............ *G06F 21/74* (2013.01); *G06F 21/725* (2013.01); *H04L 9/3236* (2013.01); *H04W 12/0471* (2021.01)

(58) Field of Classification Search
None
See application file for complete search history.

(56) References Cited

U.S. PATENT DOCUMENTS

2004/0034766 A1*  2/2004  Sakamura ................ G06K 7/00
                                              713/2
2013/0054473 A1*  2/2013  Jan ................... G06Q 20/40975
                                              705/71
(Continued)

FOREIGN PATENT DOCUMENTS

KR         10-1662947 B1    10/2016
KR       10-2017-0067003 A   6/2017

OTHER PUBLICATIONS

Reddy, Anil Kumar, Mobile Secure Data protection using eMMC RPMB Partition. pp. 946-950.

*Primary Examiner* — Benjamin E Lanier
(74) *Attorney, Agent, or Firm* — Cha & Reiter, LLC

(57) ABSTRACT

Various embodiments relating to an electronic device are described, and according to an embodiment, the electronic device may comprise a communication module which performs wireless communication; at least one processor which is electrically connected to the communication module; and a memory which stores instructions which cause at least one processor to receive or transmit data via communication with an external electronic device using the communication module on the basis of a first operating system and to process the received data or data to be transmitted to the external electronic device using a designated key on the basis of a second operating system, at the time of execution thereof.

14 Claims, 9 Drawing Sheets

(51) Int. Cl.
*H04L 9/32* (2006.01)
*H04W 12/0471* (2021.01)

(56) References Cited

U.S. PATENT DOCUMENTS

| | | | |
|---|---|---|---|
| 2013/0166451 A1* | 6/2013 | Lee | G06Q 20/409 |
| | | | 705/44 |
| 2013/0219507 A1* | 8/2013 | Chang | G06F 21/60 |
| | | | 726/26 |
| 2014/0108805 A1 | 4/2014 | Smith et al. | |
| 2016/0080149 A1* | 3/2016 | Mehta | H04L 9/0897 |
| | | | 713/165 |
| 2016/0234176 A1 | 8/2016 | Chu et al. | |
| 2016/0254918 A1 | 9/2016 | Liu et al. | |
| 2017/0161507 A1* | 6/2017 | Wang | G06F 1/32 |
| 2017/0180332 A1 | 6/2017 | Cheng et al. | |
| 2017/0185538 A1* | 6/2017 | Khan | G06F 21/86 |
| 2018/0239896 A1* | 8/2018 | Kato | G06F 9/45558 |

\* cited by examiner

ELECTRONIC DEVICE AND METHOD FOR TRANSMITTING AND RECEIVING DATA ON THE BASIS OF SECURITY OPERATING SYSTEM IN ELECTRONIC DEVICE

CROSS-REFERENCE TO RELATED APPLICATIONS(S)

This application is a National Phase Entry of PCT International Application No. PCT/KR2018/014205, which was filed on Nov. 19, 2018 and claims a priority to Korean Patent Application No. 10-2017-0154918, which was filed on Nov. 20, 2017, the contents of which are incorporated herein by reference.

FIELD

Various embodiments of the disclosure relate to an electronic device and a method for transmitting or receiving data based on a secure operating system in the electronic device.

DESCRIPTION OF THE RELATED ART

Owing to the remarkable progress of the latest information communication technology, the latest semiconductor technology, and the like, the spread and use of various types of electronic devices have rapidly increased. In particular, the latest electronic devices are portable and can perform communication, can provide various services by using applications, and can transmit or receive various types of data to/from external electronic devices or external servers.

An electronic device may include at least one processor and an Operating System (OS) so that the electronic device can provide various services, and the OS of the electronic device is strategically opened by a major manufacturer and a major provider, and thus an application program interface, a software development kit, and even a source file are open to the public.

However, according to the use of such an open OS, the security of data of the electronic device becomes vulnerable, and actually, cases in which data of the electronic devices is damaged or hacked using various types of malicious codes, and the like have frequently occurred. Therefore, various types of methods for protecting data of an electronic device have recently been sought.

SUMMARY

Recently, according to a rapid increase in the connectivity of an electronic device, the electronic device and an external electronic device, such as an external server or another electronic device external to the electronic device, may be mutually operated through transmission/reception of data by the electronic device to/from the external electronic device. However, a security solution is inadequate for security at the time of transmission/reception of data between the electronic device and the external electronic device.

For example, a security solution at the time of transmission/reception of data between the electronic device and the external electronic device needs to consider both security of a communication channel and security of transmitted/received data, but a specific security solution for this configuration is not being provided.

Various embodiments of the disclosure may provide an electronic device and a method capable of, when data is transmitted or received between an electronic device and an external electronic device, safely transmitting or receiving data between the electronic device and the external electronic device by using a secure operating system.

Various embodiments of the disclosure may provide an electronic device and a method capable of, when data is transmitted or received between an electronic device and an external electronic device, safely transmitting or receiving data between the electronic device and the external electronic device by: performing secure communication between the electronic device and the external electronic device by using a first operating system; and processing encryption of data transmitted or received between the electronic device and the external electronic device by using a second operating system.

In accordance with an aspect of the disclosure, an electronic device may include: a communication module configured to perform wireless communication; a memory; and at least one processor configured to be electrically connected to the communication module and the memory, wherein the memory is configured to store instructions that, when executed, cause the at least one processor to: receive or transmit data via communication with an external electronic device by using the communication module based on a first operating system; and process the received data or data to be transmitted to the external electronic device by using a designated key based on a second operating system.

In accordance with another aspect of the disclosure, a method for transmitting or receiving data based on a secure operating system in an electronic device may include: receiving or transmitting data via communication with an external electronic device by using a communication module based on a first operating system; and processing the received data or data to be transmitted to the external server by using a designated key based on a second operating system.

In accordance with still another aspect of the disclosure, a non-transitory computer-readable recording medium may store a program configured to cause an electronic device to perform: receiving or transmitting data via communication with an external electronic device by using a communication module based on a first operating system; and processing the received data or data to be transmitted to the external electronic device by using a designated key based on a second operating system.

According to various embodiments, when data is transmitted or received between an electronic device and an external electronic device, communication between the electronic device and the external electronic device is performed based on a first operating system, and encryption of the data transmitted or received between the electronic device and the external electronic device is processed using a designated key shared between the electronic device and the external electronic device based on a second operating system, so that data can be safely transmitted or received between the electronic device and the external electronic device.

For example, a designated key shared between an electronic device and an external electronic device may be to encrypt data transmitted or received between the electronic device and the external electronic device, and thus the encrypted data may be decrypted only via the designated key. Therefore, even when the encrypted data is exposed in a communication process, due to decryption incapability of an attacker, it is possible to ensure the security of data transmitted or received between the electronic device and the external electronic device.

DETAILED DESCRIPTION

Figure 1:
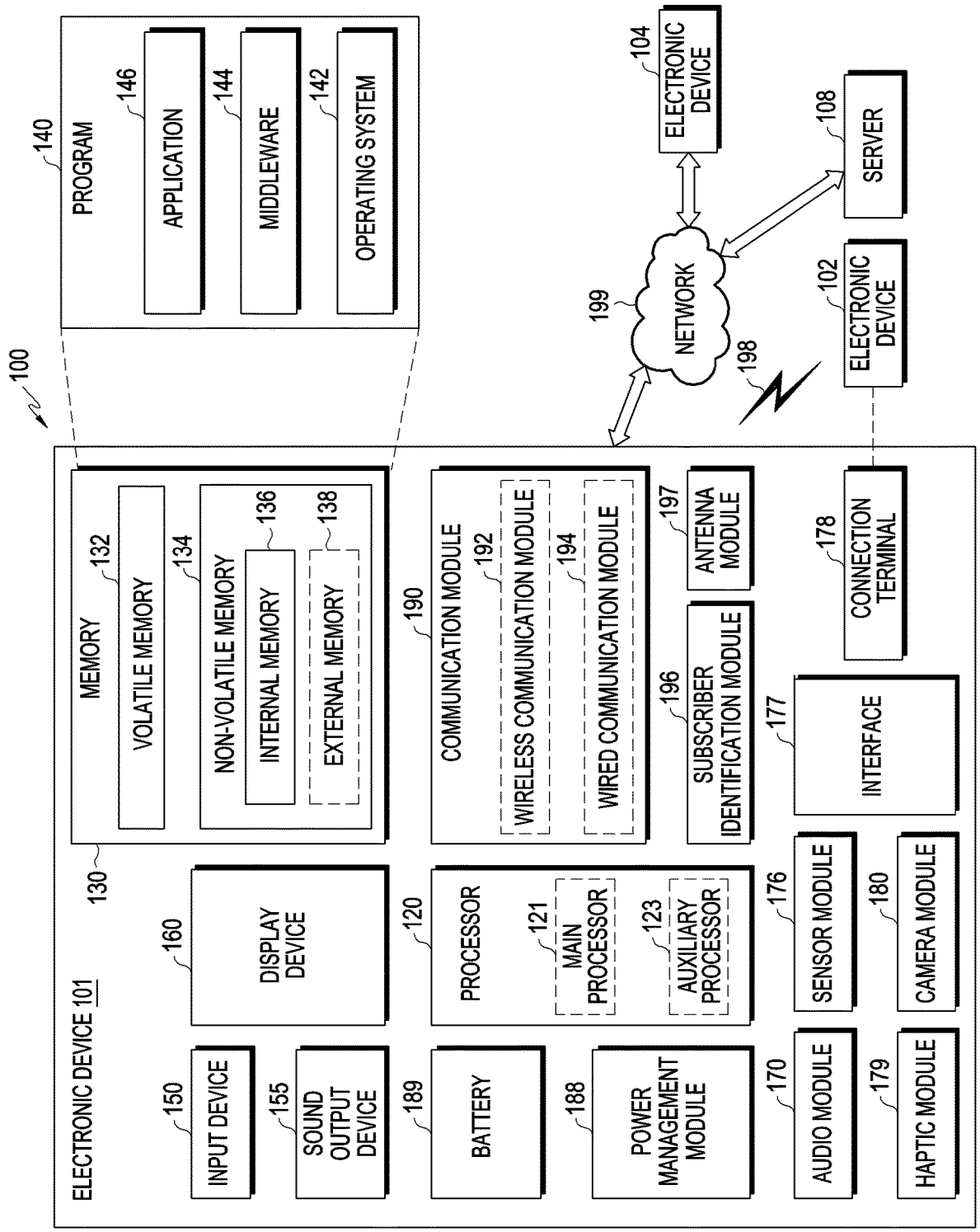
FIG. 1 is a diagram illustrating an electronic device and an external electronic device according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing and computation. The processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be operated separately from or embedded in the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to a user of the electronic device 101. The display device 160 may include, for example, a display, a hologram device, or a projector and control circuitry to control a corresponding one of the display, hologram device, and projector. According to an embodiment, the display device 160 may include touch circuitry, or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) wiredly or wirelessly coupled with the electronic device 101.

The sensor module 176 may detect an operational state (e.g., power or temperature) of the electronic device 101 or an environmental state external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support specified protocols to be used for the electronic device 101 to be coupled with the external electronic device (e.g., the electronic device 102) wiredly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a wired communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules 190 may be implemented as a single chip, or may be implemented as chips separate from each other.

According to an embodiment, the wireless communication module 192 may identify and authenticate the electronic device 101 in a communication network, using subscriber information stored in the subscriber identification module 196.

The antenna module 197 may include at least one antenna for transmitting or receiving a signal or power to or from the outside of the electronic device 101. According to an embodiment, the communication module 190 (e.g., the wireless communication module 192) may transmit or receive a signal to or from the external electronic device via an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices. According to an embodiment, if the electronic device 101 should perform a function or a service automatically, or in response to a request, the electronic device 101, instead of, or in addition to, executing the function or the service, may request the one or more external electronic devices to perform at least part of the function or the service. The one or more external electronic devices receiving the request may perform the at least part of the function or the service requested, or an additional function, and transfer an outcome of the performing to the electronic device 101. The electronic device 101 may provide the function or the service requested, with or without further processing of the outcome. To that end, a cloud computing, distributed computing, or client-server computing technology may be used, for example.

The electronic device according to various embodiments disclosed herein may be one of various types of electronic devices. The electronic devices may include, for example, at least one of a portable communication device (e.g., a smart phone), a computer device, a portable multimedia device, a portable medical device, a camera, a wearable device, or a home appliance. According to an embodiment, the electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may use corresponding components regardless of importance or an order and be used to simply distinguish a corresponding component from another, without liming the components. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly, or via another element (e.g., third element).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including an instruction that is stored in a machine-readable storage medium (e.g., internal memory 136 or external memory 138) that is readable by a machine (e.g., computer). The machine may invoke the instruction stored in the storage medium, be operated according to the instruction invoked, and include the electronic device (e.g., electronic device 101) according to various embodiments. When the instruction is executed by a processor (e.g., the processor 120), the processor may directly execute a function corresponding to the instruction, or use other components to execute the function under the control of the processor. The instruction may include a code generated by a complier or a code executable by an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, some components (e.g., modules or programs) may be integrated into a single component. In such a case, according to various embodiments, the integrated component may still perform functions of each of some components in the same or similar manner as they are performed by a corresponding one of some components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device (e.g., the electronic device 101 of FIG. 1) may include: a communication module (e.g., the communication module 190 of FIG. 1) configured to wirelessly communicate with an external electronic device (e.g., the electronic device 102, the electronic device 104, or the server 108 of FIG. 1); a memory (e.g., the memory 130 of FIG. 1); and at least one processor (e.g., the processor 120 of FIG. 1) configured to be electrically connected to the communication module and the memory, wherein the memory is configured to store instructions that, when executed, cause the at least one processor to: receive or transmit data via communication with the external electronic device by using the communication module based on a first operating system; and process the received data or data to be transmitted to the external electronic device by using a designated key based on a second operating system.

According to various embodiments, the designated key may correspond to a secret key, and the memory may be configured to store the designated key in a storage area accessible only by the second operating system.

According to various embodiments, the memory may include a Replay Protected Memory Block (RPMB), and the designated key may be stored in the RPMB.

According to various embodiments, the memory may be configured to further store instructions that, when executed, cause the at least one processor to: allow the second operating system to encrypt the designated key and deliver the encrypted designated key to the first operating system; and allow the first operating system to transmit the encrypted designated key to the external electronic device via the communication module.

According to various embodiments, the instructions may be configured to cause the at least one processor to: when validity information, generated using the designated key, and first data are received from the external electronic device by using the communication module based on the first operating system, determine whether the first data is valid, by using the validity information based on the second operating system; and when the first data is valid, update data stored in the electronic device or a state of the electronic device based on the first data.

According to various embodiments, the validity information related to the first data may correspond to a token that the external electronic device generates based on the first data, the designated key, and a random value generated by the electronic device.

According to various embodiments, the validity information may include a Hash-based Message Authentication Code (HMAC).

According to various embodiments, the first data may include data for updating display data or a locked state of the electronic device.

According to various embodiments, the instructions may be configured to cause the at least one processor to, when a request for transmission of second data is received from the external electronic device by using the communication module based on the first operating system, encrypt and provide the second data by using the designated key based on the second operating system.

According to various embodiments, the memory may be configured to further store instructions that cause the at least one processor to: receive authentication information for authentication of the external electronic device, from the external electronic device by using the wireless communication module based on the first operating system; and authenticate the external electronic device by using the received authentication information based on the second operating system.

Figure 2:
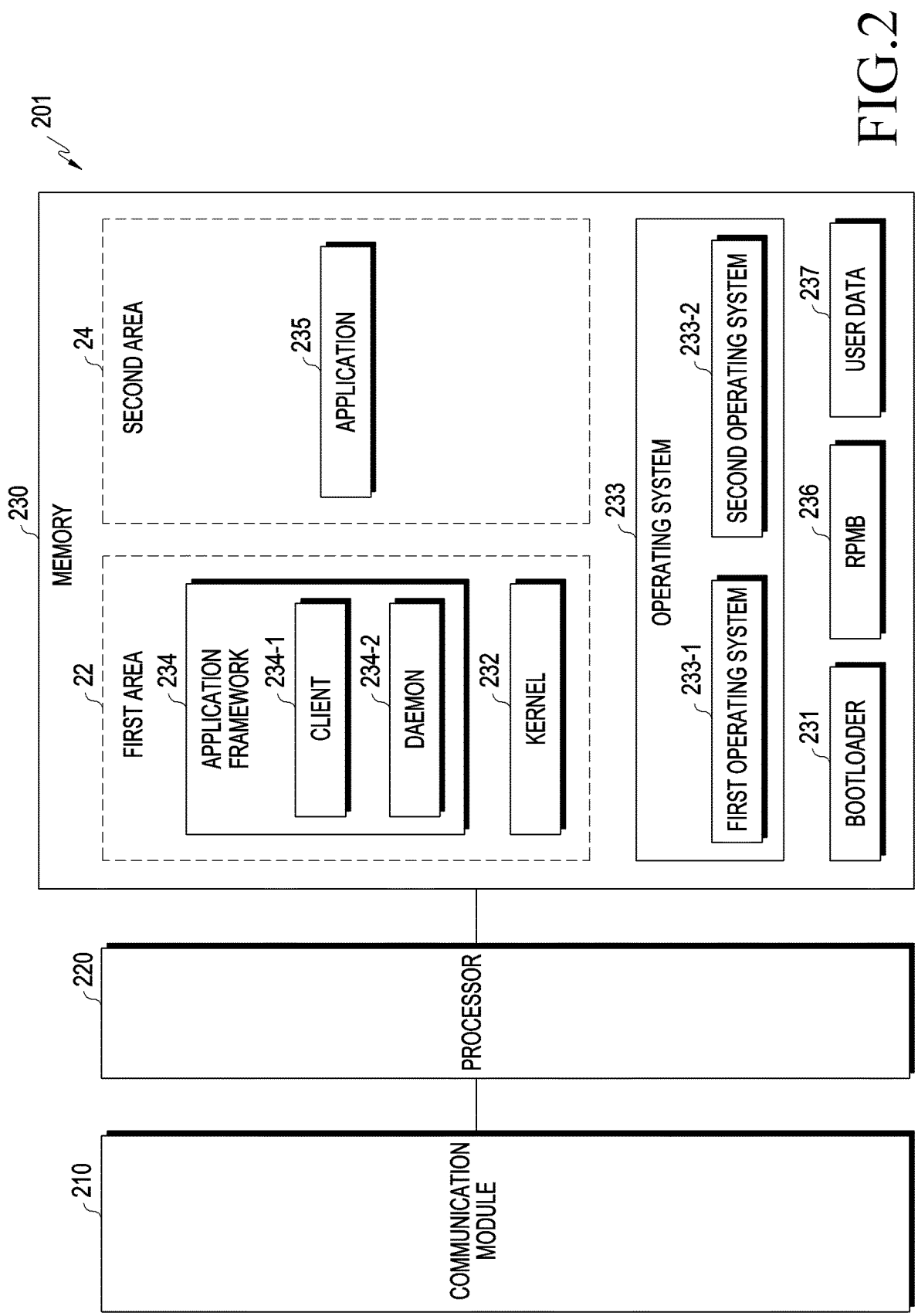
FIG. 2 is a diagram illustrating a configuration of an electronic device according to various embodiments.

FIG. 2 is a diagram illustrating a configuration of an electronic device 201 (e.g., the electronic device 101 of FIG. 1) according to various embodiments. Referring to FIG. 2, the electronic device 201 may include a communication module 210 (e.g., the communication module 190 of FIG. 1), a processor 220 (e.g., the processor 120 of FIG. 1), and a memory 230 (e.g., the memory 130 of FIG. 1).

The communication module 210 may support establishment of a wired or wireless communication channel between the electronic device 201 and an external electronic device (e.g., the electronic device 102, the electronic device 104, or the server 108 of FIG. 1), and execution of communication via the established communication channel. According to various embodiments, the communication module 210 may support the electronic device 201 so that the electronic device 201 can, for example, communicate with the external server 108 based on a security protocol. For example, the security protocol may be a Transport Layer Security (TLS) protocol or a Secure Sockets Layer (SSL) protocol, and may be a protocol other than the TLS protocol or the SSL protocol.

The processor 220 may execute software (e.g., a first operating system 233-1 and a second operating system 233-2) stored in the memory 230, and thus may control at least another element (e.g., a hardware or software element) of the electronic device 201 connected to the processor 220, so as to perform various data processings and arithmetic operations. The processor 220 may load commands or data received from another element (e.g., the communication module 210) into a volatile memory (e.g., reference numeral 132 in FIG. 1), may process the same, and may store the resulting data in a non-volatile memory (e.g., reference numeral 134 in FIG. 1). According to an embodiment, as at least one processor, the processor 220 may include a main processor (e.g., reference numeral 121 in FIG. 1, i.e., a central processing unit or an application processor) and an auxiliary processor (e.g., reference numeral 123 in FIG. 1) which is configured to: be operable independently of the main processor; and additionally or alternatively, consume less power than the main processor, or be specific to a specified function.

The memory 230 may store software (e.g., the program 140) and related data for various data processings and arithmetic operations within the electronic device 201. According to various embodiments, the memory 230 may store instructions that, when executed, cause the processor 220 to: receive or transmit data via communication with an external electronic device (e.g., an external server, i.e., reference numeral 108 in FIG. 1) by using the communication module 210 based on the first operating system 233-1; and process the received data or data to be transmitted to the external electronic device (e.g., the external server 108) by using a designated key, for example, a secret key, based on the second operating system 233-2. According to various embodiments, instructions may include software and related data.

According to various embodiments, software and related data may include a bootloader 231, a kernel 232, an operating system 233, an application framework 234, an application 235, a Replay Protected Memory Block (RPMB) 236, and user data 237.

The bootloader 231 may perform a booting operation according power-on of electronic device 201. According to various embodiments, when performing a booting operation, the bootloader 231 may check, through the kernel 232, whether each of the first operating system 233-1 and the second operating system 233-2 is modified, and if the first operating system 233-1 and the second operating system 233-2 are normal, allow each of the first operating system 233-1 and the second operating system 233-2 to be loaded and operated by the processor 220.

According to an embodiment, the kernel 232 may check whether a system image of each of the first operating system 233-1 and the second operating system 233-2 is modified, by using at least one module (e.g., a dm-verify module). According to an embodiment, a system image of the first operating system 233-1 may include all binaries and libraries constituting an application framework, and a system image of the second operating system 233-2 may include all binaries and libraries constituting a secure OS.

The operating system 233 may include the first operating system 233-1 and the second operating system 233-2. According to various embodiments, according to power-on of the electronic device 201, the first operating system 233-1 and the second operating system 233-2 may be loaded, and the processor 220 may operate based on the first operating system 233-1 or the second operating system 233-2. According to various embodiments, the first operating system 233-1 may be a normal OS, and the second operating system 233-2 may be a secure OS which operates independently of the normal OS. According to various embodiments, the first operating system 233-1 may operate based on a first area 22 in the memory 230, and the second operating system 233-2 may operate based on a second area 24 in the memory 230. According to an embodiment, the first area 22 may be accessed by the first operating system 233-1, and the second area 24 may be accessed by the second operating system 233-2. For example, the first area 22 may be a normal area or a non-secure area, and the second area 24 may be a secure area. Processes in a normal area or a non-secure area correspond to an environment in which safety cannot be ensured from the threat of an external attacker, but a secure area corresponds to an independent processing environment (a Trusted Execution Environment (TEE)) which is distinguished from the normal area or the non-secure area and may correspond to an environment for protection of safety from the threat of an external attacker.

The application framework 234 may include a binary and a library needed to perform a function related to at least one application executable by the electronic device 201, and may be accessed based on the first area 22 by the first operating system 233-1.

According to various embodiments, the application framework 234 may include a client 234-1 and a daemon 234-2. The client 234-1 may include a binary and a library needed to perform a function of receiving or transmitting data via communication with an external electronic device (e.g., an external server, i.e., reference numeral 108 in FIG. 1) by using the communication module 210 based on the first operating system 233-1. The daemon 234-2 may include a binary and a library needed to perform a function of delivering data, received from an external server, via the kernel 232 to the application 235 which is based on the second operating system 233-2, and delivering data, provided by the application 235, via the kernel 232 to the client 234-1 which is based on the first operating system 233-1.

The application 235 may be executed based on the second operating system 233-2, and may be configured to process data received from an external electronic device (e.g., the electronic device 102, the electronic device 104, or the server 108 of FIG. 1) or data to be transmitted to the external electronic device, by using a designated key, for example, a secret key.

The RPMB (236) area may be a storage area accessible by only the second operating system 233-2. According to various embodiments, the RPMB (236) area may store a designated key, for example, a secret key. According to an embodiment, a designated key may be encrypted by the application 235, and the encrypted designated key may be stored in the RPMB (236) area. According to various embodiments, a designated key may be shared by the electronic device 201 and an external electronic device (e.g., the electronic device 102, the electronic device 104, or the server 108 of FIG. 1). For example, the electronic device 201 may authenticate the server 108 and provide a designated key to the server 108 when authentication of the server 108 is successful, and thus the designated key may be shared by the electronic device 201 and the server 108. The external server may use the designated key provided by the electronic device 201.

The user data (237) area may be accessed by various processes having an access right among processes which are based on the first operating system 233-1 and the second operating system 233-2, and may store, therein, various data related to a user of the electronic device 201.

According to various embodiments, the processor 220 may receive authentication information (certificate) for authentication of a server from the server (e.g., the server 108 of FIG. 1) via the communication module 210 by using the client 234-1 based on the first operating system 233-1, and may deliver the received authentication information to the application 235, executed based on the second operating system 233-2, by using the daemon 234-2. The processor 220 may authenticate the external server by using the received authentication information through the application 235 executed based on the second operating system 233-2. According to various embodiments, the processor 220 may provide a designated key to the authenticated server.

According to various embodiments, the processor 220 may encrypt a designated key by using the application 236 executed based on the second operating system 233-2, and may deliver the encrypted designated key to the daemon 234-2. The processor 220 may transmit the encrypted designated key, delivered to the daemon 234-2, to a server (e.g., the server 108 of FIG. 1) via the communication module 210 by using the client 234-1.

According to various embodiments, the processor 220 may receive first data and validity information, generated using a designated key, from an external server (e.g., the server 108 of FIG. 1) via the communication module 210 by using the client 234-1 based on the first operating system 233-1, and may deliver the received first data and validity information to the application 235, executed based on the second operating system 233-2, by using the daemon 234-2. The processor 220 may determine whether the first data is valid, by using the application 235 executed based on the second operating system 233-2, and if the first data is valid, may update data, stored in the memory 230, or a state of the electronic device 201, based on the first data. According to various embodiments, validity information may be a token generated by the external server based on first data, a designated key, and a random value (e.g., a device nonce) generated by the electronic device. According to various embodiments, a token may include a Hash-based Message Authentication Code (HMAC). According to various embodiments, first data may include data for updating display data or a locked state of the electronic device.

According to various embodiments, the processor 220 may receive a request for transmission of second data (or a second data transmission request) from an external server (e.g., the server 108 of FIG. 1) via the communication module 210 by using the client 234-1 based on the first operating system 233-1, and may deliver the received second data transmission request to the application 235, executed based on the second operating system 233-2, by using the daemon 234-2. The processor 220 may encrypt the requested second data by using a designated key through the application 235 executed based on the second operating system 233-2, and may deliver the encrypted second data to the daemon 234-2. The processor 220 may transmit the encrypted second data, delivered to the daemon 234-2, to an external server (e.g., the server 108 of FIG. 1) via the communication module 210 by using the client 234-1.

According to various embodiments, a method for transmitting or receiving data based on a secure operating system in an electronic device (e.g., the electronic device 101 of FIG. 1 or the electronic device 201 of FIG. 2) may include: receiving or transmitting data via communication with an external electronic device (e.g., the electronic device 102, the electronic device 104, or the server 108 of FIG. 1) by using a communication module (e.g., the communication module 190 of FIG. 1 or the communication module 210 of FIG. 2) based on a first operating system (e.g., the first operating system 233-1 of FIG. 2); and processing the received data or data to be transmitted to the external electronic device by using a designated key based on a second operating system.

According to various embodiments, the designated key may correspond to a secret key, and may be stored in a storage area accessible only by the second operating system.

According to various embodiments, the electronic device may include a Replay Protected Memory Block (RPMB) which is a storage area accessible only by the second operating system.

According to various embodiments, the method may further include encrypting the designated key and delivering the encrypted designated key to the first operating system, by the second operating system, and transmitting the encrypted designated key to the external electronic device via the communication module, by the first operating system.

According to various embodiments, in the method, when validity information, generated using the designated key, and first data are received from the external electronic device by using the communication module based on the first operating system, whether the first data is valid may be determined using the designated key and the validity information based on the second operating system; and when the first data is valid, data stored in the electronic device or a state of the electronic device may be updated based on the first data.

According to various embodiments, the validity information may correspond to a token that the external electronic device generates based on the first data, the designated key, and a random value generated by the electronic device.

According to various embodiments, the first data may include data for updating display data or a locked state of the electronic device.

According to various embodiments, when a request for transmission of second data is received from the external electronic device by using the communication module based on the first operating system, the electronic device may encrypt and provide the second data by using the designated key based on the second operating system.

According to various embodiments, the method may further include: receiving authentication information for authentication of the external electronic device, from the external electronic device by using the wireless communication module based on the first operating system; and authenticating the external electronic device by using the received authentication information based on the second operating system.

Figure 3:
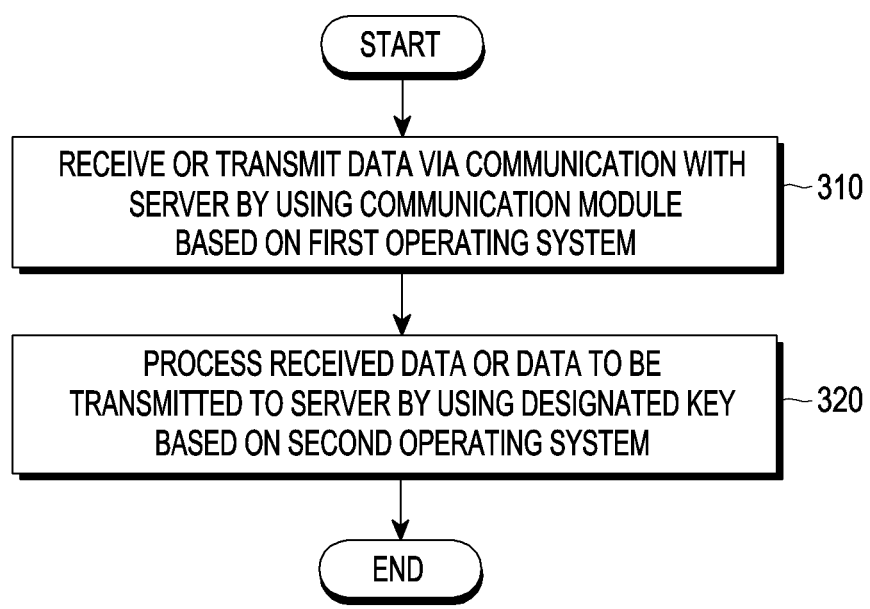
FIG. 3 is a flowchart illustrating an operation of an electronic device according to various embodiments.

FIG. 3 is a flowchart illustrating an operation of an electronic device according to various embodiments.

Referring to FIG. 3, in operation 310, the processor 220 (e.g., the processor 120 of FIG. 1) of the electronic device 201 (e.g., the electronic device 101 of FIG. 1) may receive or transmit data via communication with an external electronic device (e.g., the electronic device 102, the electronic device 104, or the server 108 of FIG. 1) by using the communication module 210 based on the first operating system 233-1. In operation 320, the processor 220 may process the received data or data to be transmitted to the external server by using a designated key, for example, a secret key, based on the second operating system 233-2.

Figure 4:
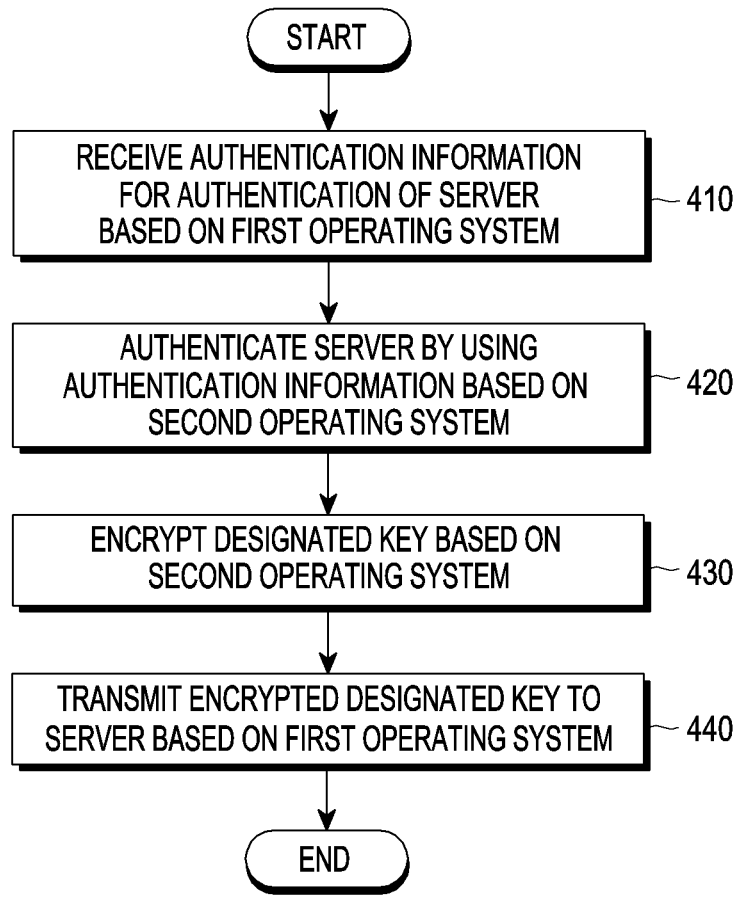
FIG. 4 is a flowchart illustrating an operation of an electronic device for transmitting a designated key to an external electronic device according to various embodiments.

FIG. 4 is a flowchart illustrating an operation of an electronic device for transmitting a designated key to an external electronic device according to various embodiments.

Referring to FIG. 4, in operation 410, the processor 220 (e.g., the processor 120 of FIG. 1) of the electronic device 201 (e.g., the electronic device 101 of FIG. 1) may receive authentication information (certificate) for authentication of an external electronic device (e.g., the electronic device 102, the electronic device 104, or the server 108 of FIG. 1) (hereinafter, the server 108 will be described as an example of the external electronic device) based on the first operating system 233-1. According to various embodiments, the processor 220 may receive authentication information (certificate) for authentication of the server 108 from the server 108 via the communication module 210 by using the client 234-1 of the application framework 234 based on the first operating system 233-1, and may deliver the received authentication information to the application 235, executed based on the second operating system 233-2, by using the daemon 234-2.

In operation 420, the processor 220 may authenticate the server 108 by using the received authentication information based on the second operating system 233-2. According to various embodiments, the processor 220 may authenticate the server 108 by using the received authentication information through the application 235 executed based on the second operating system 233-2.

In operation 430, the processor 220 may encrypt a designated key based on the second operating system 233-2. According to various embodiments, when authentication of the server 108 is successful, the processor 220 may encrypt a designated key by using the application 235 executed based on the second operating system 233-2, and may deliver the encrypted designated key to the daemon 234-2 which is based on the first operating system 233-1.

According to various embodiments, the processor 220 may encrypt a designated key by using a hybrid encryption scheme. The hybrid encryption scheme may be configured to: encrypt actual data, that is, a designated key, by using symmetric encryption (e.g., an Advanced Encryption Standard (AES) algorithm); and encrypt a key and an Initial Vector (IV), which are used for the symmetric encryption, by using asymmetric encryption (e.g., Rivest Shamir Adleman (RSA)). In other words, a session key and an IV, which are used for the symmetric encryption, may be values randomly generated for every protocol, and as a result, a session key and an IV may be generated and used to encrypt a designated key. According to an embodiment, a combination of a designated key, a device nonce generated by the electronic device, and a server nonce in the server 108 may be encrypted using a session key and an IV which have been generated. The encrypted designated key can be decrypted only by the server, and thus even when the encrypted designated key is exposed in a communication process, due to decryption incapability of an attacker, the attacker may not acquire the designated key. Therefore, it is possible to ensure the security of a designated key transmitted from the electronic device to the server.

In operation 440, the processor 220 may transmit the encrypted designated key to the server 108 based on the first operating system 233-1. According to various embodiments, the processor 220 may transmit the encrypted designated key, delivered to the daemon 234-2 which is based on the first operating system 233-1, to the server 108 via the communication module 210 by using the client 234-1.

Figure 5:
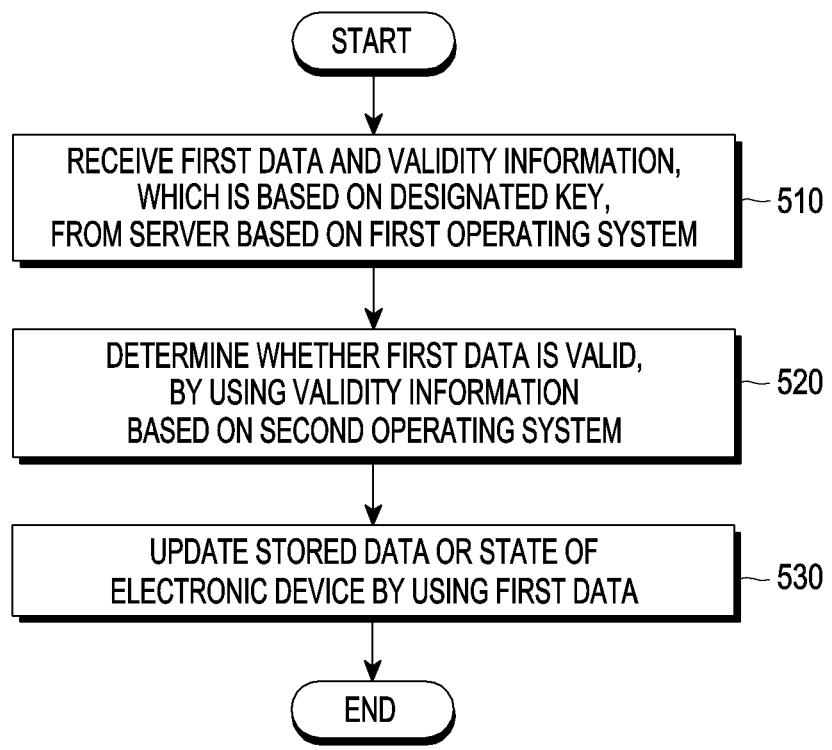
FIG. 5 is a flowchart illustrating an operation of an electronic device for receiving data from an external electronic device according to various embodiments.

FIG. 5 is a flowchart illustrating an operation of an electronic device for receiving data from an external electronic device according to various embodiments.

Referring to FIG. 5, in operation 510, the processor 220 (e.g., the processor 120 of FIG. 1) of the electronic device 201 (e.g., the electronic device 101 of FIG. 1) may receive first data and validity information, which is based on a designated key, from an external electronic device (e.g., the electronic device 102, the electronic device 104, or the server 108 of FIG. 1) (hereinafter, the server 108 will be described as an example of the external electronic device) based on the first operating system 233-1. For example, the first data is data for which a write request is received by the electronic device 201 and which is then written to the electronic device 201, and after receiving a write request from the server 108, the processor 220 may receive first data and validity information from the server 108. According to various embodiments, the processor 220 may receive first data and validity information from the server 108 via the communication module 210 by using the client 234-1 based on the first operating system 233-1, and may deliver the received first data and validity information to the application 235, executed based on the second operating system 233-2, by using the daemon 234-2.

In operation 520, the processor 220 may determine whether the received first data is valid, by using the received validity information based on the second operating system 233-2. According to various embodiments, validity information may be a token that the external server generates based on first data, a designated key, and a random value (nonce) generated by the electronic device. According to various embodiments, a token may include an HMAC. According to various embodiments, the processor 220 may determine the HMAC by using a designated key through the application, executed based on the second operating system 233-2, and thus may determine whether first data is valid.

In operation 530, if the first data is valid, the processor 220 may update data stored in the memory 230 or a state of the electronic device 201 by using the first data. According to various embodiments, if the first data is valid, the processor 220 may update data stored in the memory 230 or a state of the electronic device 201 by using the first data through the application 235 executed based on the second operating system 233-2. According to various embodiments, first data may include data for updating display data or a locked state of the electronic device.

Figure 6:
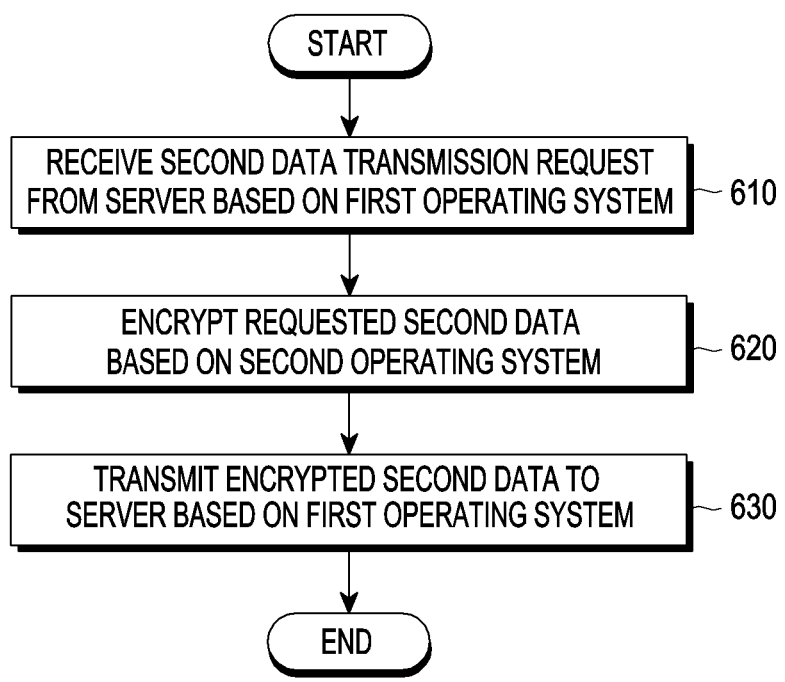
FIG. 6 is a flowchart illustrating an operation of an electronic device for transmitting data to an external electronic device according to various embodiments.

FIG. 6 is a flowchart illustrating an operation of an electronic device for transmitting data to an external electronic device according to various embodiments.

Referring to FIG. 6, in operation 610, the processor 220 (e.g., the processor 120 of FIG. 1) of the electronic device 201 (e.g., the electronic device 101 of FIG. 1) may receive a request for transmission of second data (or a second data transmission request) from an external electronic device (e.g., the electronic device 102, the electronic device 104, or the server 108 of FIG. 1) (hereinafter, the server 108 will be described as an example of the external electronic device) based on the first operating system 233-1. For example, the second data transmission request may be a read request for making a request for reading data of the electronic device 201. According to various embodiments, the processor 220 may receive a request for transmission of second data (or a second data transmission request) from a server (e.g., the server 108 of FIG. 1) via the communication module 210 by using the client 234-1 based on the first operating system 233-1, and may deliver the received second data transmission request to the application 235, executed based on the second operating system 233-2, by using the daemon 234-2.

In operation 620, the processor 220 may encrypt the requested second data based on the second operating system 233-2, and may provide the encrypted second data. According to various embodiments, the processor 220 may encrypt the requested second data by using a designated key through the application 235 executed based on the second operating system 233-2. According to various embodiments, the processor 220 may encrypt second data by using a hybrid encryption scheme. The hybrid encryption scheme may be configured to: encrypt actual data, that is, second data, by using symmetric encryption (e.g., an AES algorithm); and encrypt a key and an IV, which are used for the symmetric encryption, by using asymmetric encryption (e.g., RSA). In other words, a session key and an IV, which are used for the symmetric encryption, may be values randomly generated for every protocol, and as a result, a session key and an IV may be generated and used to encrypt second data. According to an embodiment, a combination of second data, a nonce (a random value) generated by the electronic device, and a nonce (a random value) generated by the server may be encrypted using a session key and an IV which have been generated. The encrypted second data can be decrypted only by the server, and thus even when the encrypted second data is exposed in a communication process, due to decryption incapability of an attacker, the attacker may not acquire the second data. Therefore, it is possible to ensure the security of second data transmitted from the electronic device to the server.

According to various embodiments, the processor 220 may deliver the encrypted second data to the daemon 234-2 via the application 235 based on the first operating system 233-1.

In operation 630, the processor 220 may transmit the encrypted second data to the server 108 based on the first operating system 233-1. According to various embodiments, the processor 220 may transmit the encrypted second data, delivered to the daemon 234-2 which is based on the first operating system 233-1, to the server 108 via the communication module 210 by using the client 234-1.

Figure 7:
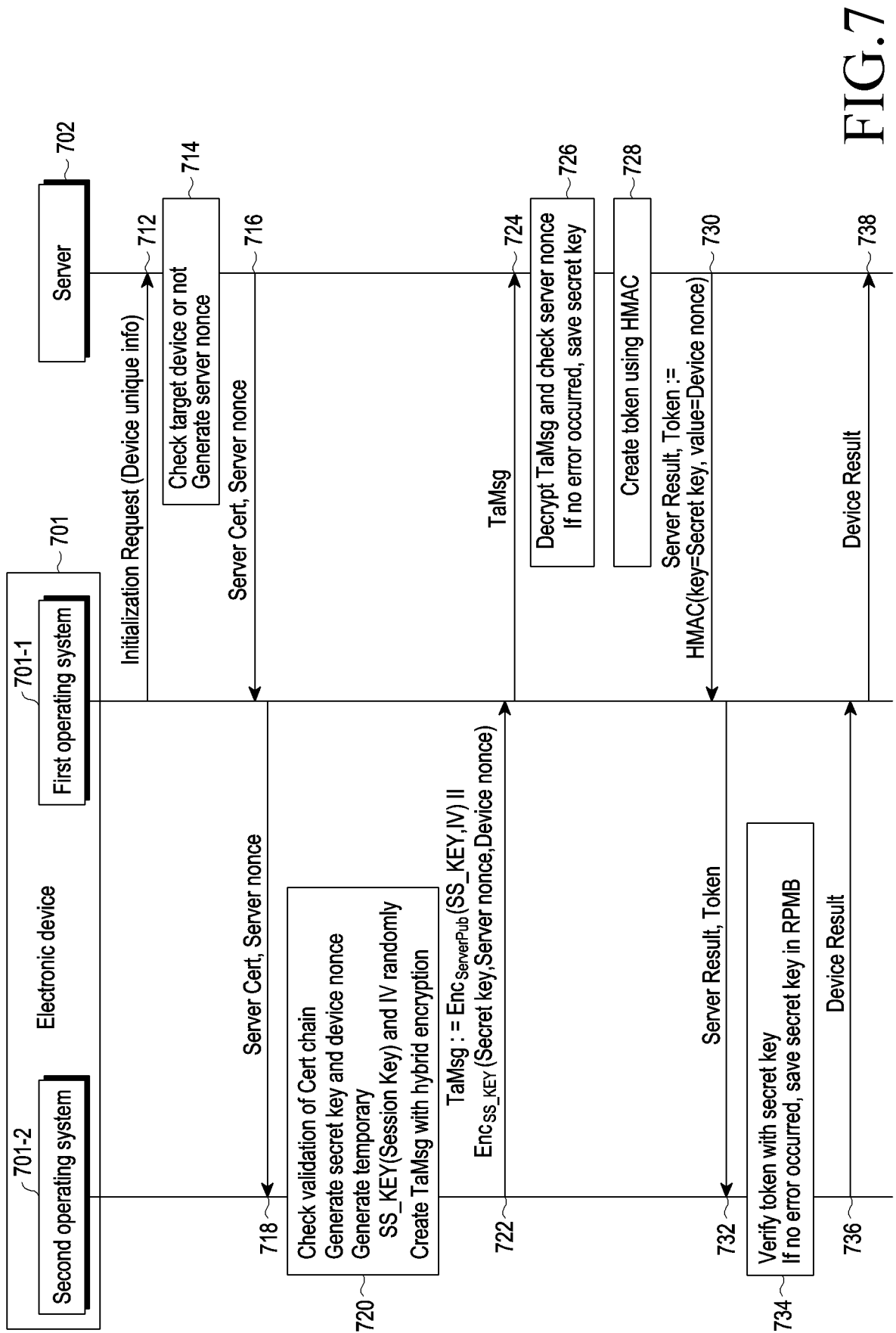
FIG. 7 is a diagram illustrating an operation of sharing a designated key between an electronic device and an external server according to various embodiments.

FIG. 7 is a diagram illustrating an operation of sharing a designated key between an electronic device and a server according to various embodiments.

Referring to FIG. 7, the electronic device 701 (e.g., the electronic device 101 of FIG. 1 or the electronic device 201 of FIG. 2) may operate based on a first operating system 701-1 (e.g., the first operating system 233-1 of FIG. 2) and a second operating system 701-2 (e.g., the second operating system 233-2 of FIG. 2). In operation 712, the electronic device 701 may transmit an initial registration request (an initialization request) message to the server 702 (e.g., the server 108 of FIG. 1) based on the first operating system 701-1. According to an embodiment, an initialization request message may include device unique info of the electronic device 701. For example, the device unique info may include an International Mobile Equipment Identity (IMEI) of the electronic device.

When an initialization request message is received, in operation 714, the server 702 may determine whether the electronic device 701 is an initial registration target device, and if the electronic device 701 is an initial registration target device, may generate a server nonce. According to an embodiment, a server nonce may be a one-time value randomly generated by the server 702.

In operation 716, the server 702 may transmit the generated server nonce and a server cert, which is authentication information (certificate) for authentication of a server, to the electronic device 701. According to various embodiments, the server 702 may store authentication information indicating a server capable of interworking with the electronic device 701. According to an embodiment, the authentication information for authentication of a server may be issued by a ROOT CA (e.g., a manufacturer of the electronic device) related to the electronic device 701, and may be stored in the server 702.

The electronic device 701 may receive a server nonce and a server cert based on the first operating system 701-1, and in operation 718, may deliver the received server nonce and server cert to the second operating system 701-2. According to an embodiment, the electronic device 701 may deliver the received server nonce and server cert to an application (e.g., reference numeral 235 in FIG. 2) executed based on the second operating system 701-2.

In operation 720, the electronic device 701 may determine whether the authentication information for authentication of a server (server cert) is valid, based on the second operating system 701-2, and if the server cert is valid, may encrypt a designated key (a secret key) to be shared with the server 702. According to various embodiments, the electronic device 701 may encrypt a designated key (a secret key) by using a hybrid encryption scheme through an application (e.g., reference numeral 235) executed based on the second operating system 701-2. For example, based on the second operating system 701-2, the electronic device 701 may generate a device nonce, may generate a session key and an IV for hybrid encryption, and may then generate an encryption message (TaMsg) corresponding to the designated key (secret key) by using the session key and the IV, the designated key, the server nonce, and the device nonce.

In operation 722, the electronic device 701 may deliver, to the first operating system 701-1, the encryption message (TaMsg) corresponding to the designated key generated based on the second operating system 701-2. For example, the electronic device 701 may deliver the generated encryption message (TaMsg) corresponding to the designated key to a client (e.g., reference numeral 234-1 in FIG. 2), which is based on the first operating system 701-1, by using an application (e.g., reference numeral 235 in FIG. 2) which is based on the second operating system 701-2.

In operation 724, the electronic device 701 may deliver the encryption message (TaMsg) corresponding to the designated key to the server 702 via a communication module based on the first operating system 701-1, and the server 702 may receive the encryption message (TaMsg) corresponding to the designated key.

In operation 726, the server 702 may decrypt the encryption message (TaMsg) which corresponds to the designated key and has been received from the electronic device 701, may identify the designated key (secret key), the server nonce, and the device nonce, and if a result of identifying of the designated key (secret key), the server nonce, and the device nonce is normal, may store the designated key (secret key).

In operation 728, the server 702 may generate information, for example, a token, for notifying of successful reception of the designated key (secret key). According to various embodiments, the server 702 may substitute the designated key (secret key) into a key of an algorithm of an HMAC, may substitute the device nonce into a value, and thus may generate an HMAC value. In operation 730, the server 702 may transmit the generated HMAC value to the electronic device 701.

The electronic device 701 may receive information, for example, a token, notifying of successful reception of the designated key (secret key) from the server 702 based on the first operating system 701-1, and in operation 732, may deliver the received token to the second operating system 701-2. According to an embodiment, the electronic device 701 may deliver the received token to an application (e.g., reference numeral 235 in FIG. 2), executed based on the second operating system 701-2, based on the first operating system 701-1.

In operation 734, the electronic device 701 may identify the token, received from the first operating system 701-1, based on the second operating system 701-2, and thus may identify that the server 702 has successfully received the designated key (secret key). If it is identified that the token is normal, the electronic device 701 may store the designated key (secret key) in an RPMB (e.g., the RPMB 236 of FIG. 2).

In operation 736, the electronic device 701 may deliver a device result, identified based on the second operating system 701-2, to the first operating system 701-1, and in operation 738, may transmit the identified device result to the server 702 via the communication module based on the first operating system 701-1. Therefore, the electronic device 701 and the server 702 may safely share the same designated key (secret key).

Figure 8:
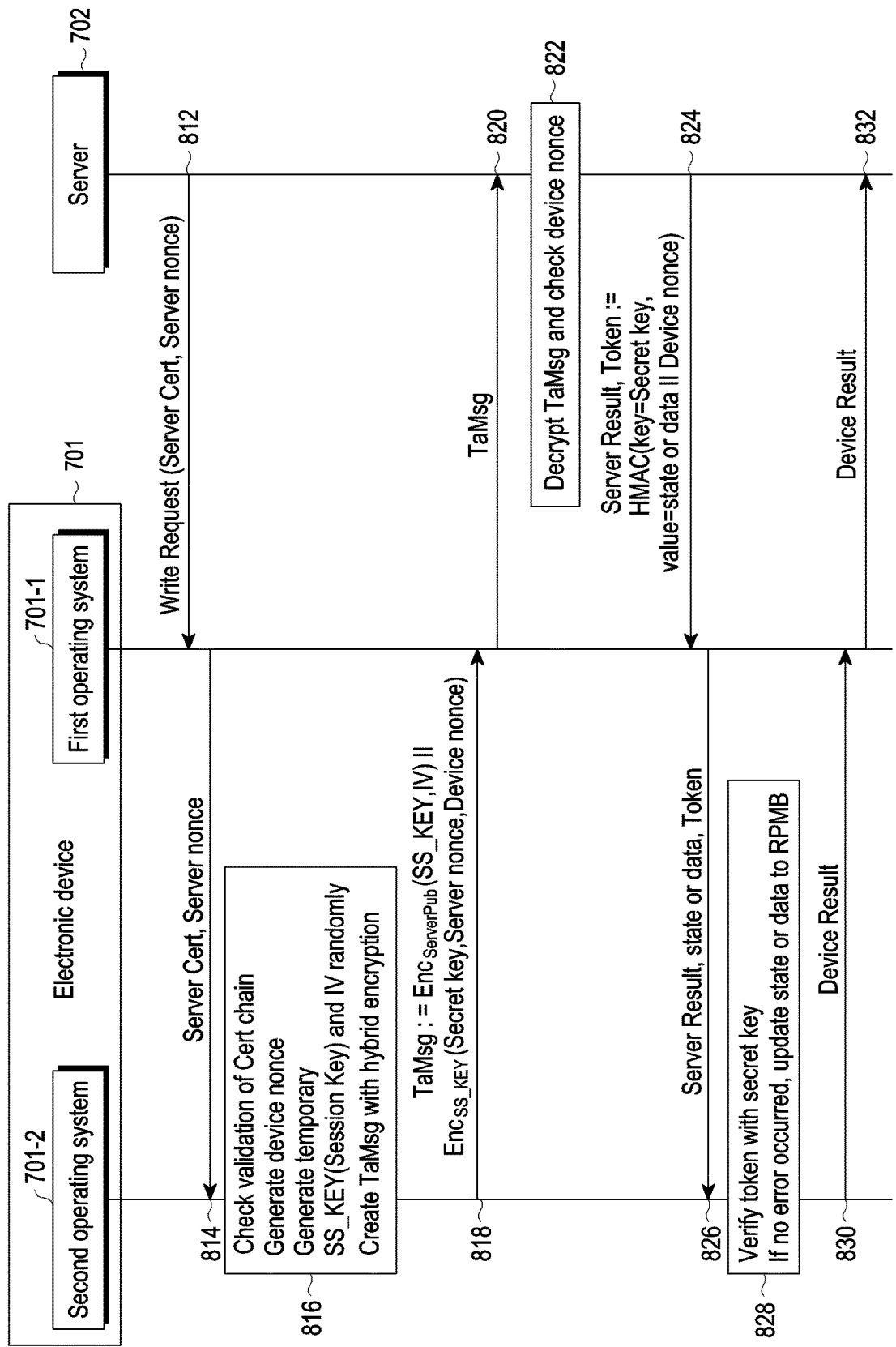
FIG. 8 is a diagram illustrating operations of an electronic device and an external server according to a data write request of the external server according to various embodiments.

FIG. 8 is a diagram illustrating operations of an electronic device and a server according to a data write request of the server according to various embodiments.

Referring to FIG. 8, in operation 812, the server 702 (e.g., the server 108 of FIG. 1) may transmit a data write request message to the electronic device 701 (e.g., the electronic device 101 of FIG. 1 or the electronic device 201 of FIG. 2). According to various embodiments, when data stored in the electronic device 701 or a state of the electronic device 701 needs to be updated, the server 702 may transmit, to the electronic device 701, a message for making a request for writing first data, needed to update the stored data or the state, to the electronic device 701. According to an embodiment, when data stored in the electronic device 701 or a state of the electronic device 701 needs to be updated, the server 702 may generate a server nonce, and may transmit, to the electronic device 701, a data write request message including the generated server nonce and a server cert which is authentication information (certificate) for authentication of a server. According to an embodiment, a server nonce may be a one-time value randomly generated by the server.

According to various embodiments, the electronic device 701 may operate based on the first operating system 701-1 (e.g., the first operating system 233-1 of FIG. 2) and the second operating system 701-2 (e.g., the second operating system 233-2 of FIG. 2), and may receive a data write request message by using a client (e.g., the client 234-1 of FIG. 2) based on the first operating system 701-1.

When the electronic device 701 receives a data write request message based on the first operating system 701-1, in operation 814, the electronic device 701 may deliver a server nonce and a server cert, included in the data write request message, to the second operating system 701-2. For example, the electronic device 701 may deliver the server nonce and the server cert to an application (e.g., reference numeral 235 in FIG. 2) executed based on the second operating system 701-2.

In operation 816, the electronic device 701 may determine whether authentication information for authentication of a server (server cert) is valid, based on the second operating system 701-2, and if the server cert is valid, may generate and encrypt a device nonce. According to an embodiment, a device nonce may be a one-time value randomly generated by the electronic device 701. According to various embodiments, the electronic device 701 may encrypt a device nonce by using a hybrid encryption scheme through an application (e.g., reference numeral 235) executed based on the second operating system 701-2. For example, based on the second operating system 701-2, the electronic device 701 may generate a device nonce, may generate a session key and an IV for hybrid encryption, and may then generate an encryption message (TaMsg) corresponding to a designated key by using the session key and the IV, the server nonce, and the device nonce.

In operation 818, the electronic device 701 may deliver, to the first operating system 701-1, the encryption message (TaMsg) corresponding to the device nonce generated based on the second operating system 701-2. For example, the electronic device 701 may deliver the encryption message (TaMsg) corresponding to the device nonce to a client (e.g., the client 234-1 of FIG. 2), which is based on the first operating system 701-1, by using an application (e.g., the application 235 of FIG. 2) which is based on the second operating system 701-2.

In operation 820, the electronic device 701 may deliver the encryption message (TaMsg) corresponding to the device nonce to the server 702 via a communication module based on the first operating system 701-1, and the server 702 may receive the encryption message (TaMsg) corresponding to the device nonce.

In operation 822, the server 702 may decrypt the encryption message (TaMsg) which corresponds to the device nonce and has been received from the electronic device 701, and thus may identify the device nonce.

In operation 824, if it is identified that the device nonce is normal, the server 702 may generate validity information (token), and may transmit the validity information (e.g., a token or an HMAC) and first data to the electronic device 701. According to various embodiments, validity information may include a token for determination of the validity of first data for which a write request is received by the electronic device 701 and which is then written to the electronic device 701. According to an embodiment, the server 702 may generate a token based on first data, a designated key (e.g., a secret key), and a device nonce. According to various embodiments, the server 702 may substitute the secret key into a key of an algorithm of an HMAC, may substitute the first data (state or data) and the device nonce into a value, and thus may generate an HMAC. The server 702 may transmit the validity information (e.g., a token or an HMAC) and the first data to the electronic device 701.

In operation 826, the electronic device 701 may receive validity information (e.g., a token or an HMAC) and first data from the server 702 based on the first operating system 701-1, and in operation 828, may deliver the validity information and the first data to an application (e.g., the application 235 of FIG. 2) executed based on the second operating system 701-2.

In operation 828, the electronic device 701 may determine whether the first data is valid, by using the designated key (e.g., a secret key) and the validity information through the application (e.g., the application 235 of FIG. 2) executed based on the second operating system 701-2, and if the first data is valid, may update data, stored in a memory (e.g., the memory 230 of FIG. 2) or in an RPMB (e.g., the RPMB 236 of FIG. 2), or a state of the electronic device 701, by using the first data. According to various embodiments, first data may include data for updating display data or a locked state of the electronic device.

In operation 830, the electronic device 701 may generate information (device result) for notifying of successful update of the stored data or the state, based on the second operating system 701-2, and may deliver, to the first operating system 701-1, the information (device result) for notifying of the successful update of the stored data or the state. In operation 832, the electronic device 701 may transmit the information (device result) for notifying of the successful update of the stored data or the state, to the server 701 via a communication module based on the first operating system 701-1.

Figure 9:
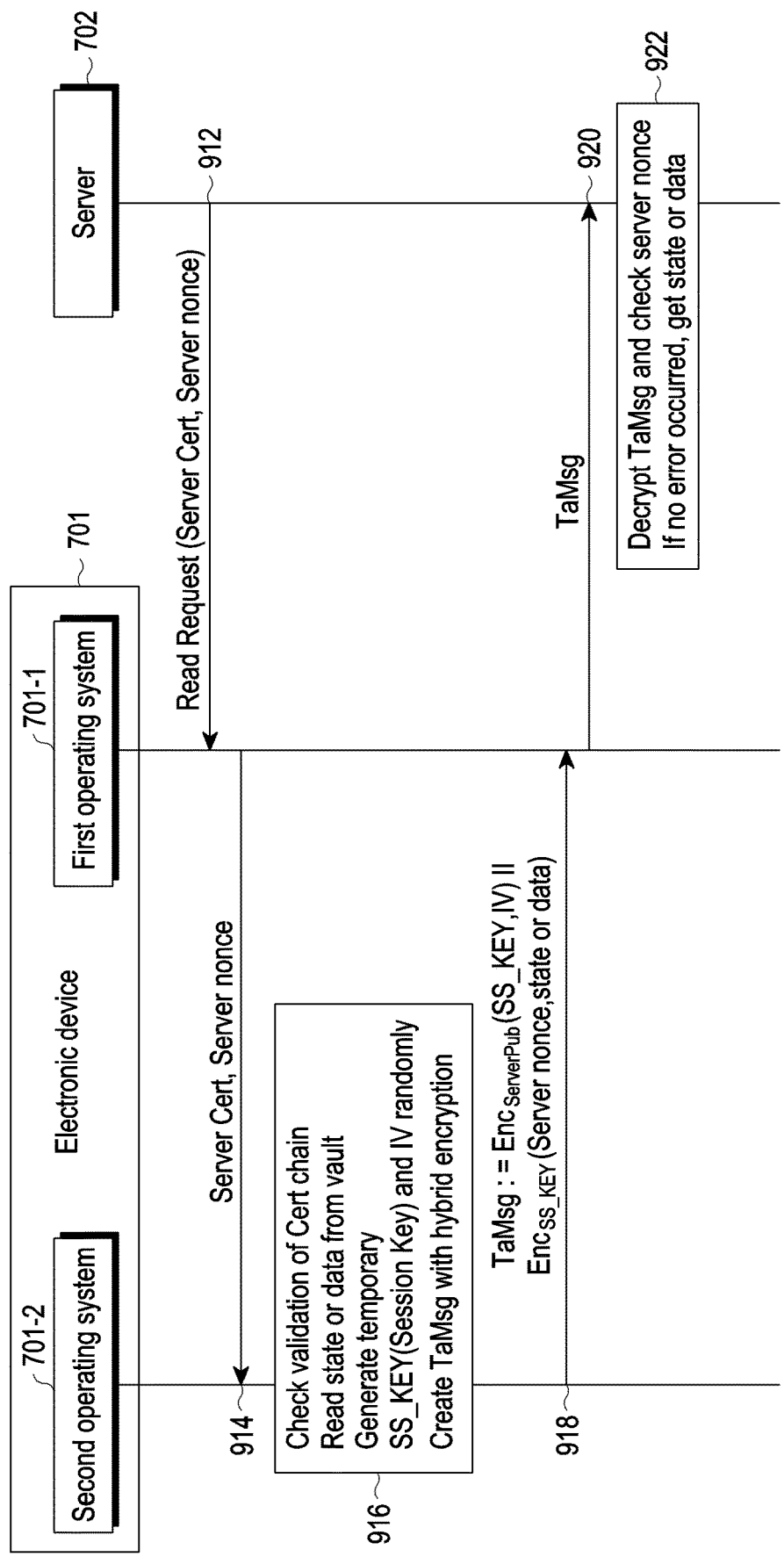
FIG. 9 is a diagram illustrating operations of an electronic device and an external server according to a data read request of the external server according to various embodiments.

FIG. 9 is a diagram illustrating operations of an electronic device and a server according to a data read request of the server according to various embodiments.

Referring to FIG. 9, in operation 912, the server 702 (e.g., the server 108 of FIG. 1) may transmit a data read request message to the electronic device 701 (e.g., the electronic device 101 of FIG. 1 or the electronic device 201 of FIG. 2). According to various embodiments, when the server 702 is to identify data stored in the electronic device 701 or a state of the electronic device 701, the server 702 may transmit, to the electronic device 701, a message for making a request for reading, from the electronic device 701, second data needed to identify update of the stored data or the state. According to an embodiment, when the server 702 needs to identify data stored in the electronic device 701 or a state of the electronic device 701, the server 702 may generate a server nonce, and may transmit, to the electronic device 701, a data read request message including the generated server nonce and a server cert which is authentication information (certificate) for authentication of a server. According to an embodiment, a server nonce may be a one-time value randomly generated by the server.

According to various embodiments, the electronic device 701 may operate based on the first operating system 701-1 (e.g., the first operating system 233-1 of FIG. 2) and the second operating system 701-2 (e.g., the second operating system 233-2 of FIG. 2), and may receive a data read request message by using a client (e.g., the client 234-1 of FIG. 2) based on the first operating system 701-1.

When the electronic device 701 receives a data read request message based on the first operating system 701-1, in operation 914, the electronic device 701 may deliver a server nonce and a server cert, which are included in the data read request message, to the second operating system 701-2. For example, the electronic device 701 may deliver a server nonce and a server cert to an application (e.g., reference numeral 235 in FIG. 2) executed based on the second operating system 701-2.

In operation 916, the electronic device 701 may determine whether authentication information for authentication of the server 702 (server cert) is valid, based on the second operating system 701-2, and if the server cert is valid, may read and encrypt second data requested to be read. According to various embodiments, the electronic device 701 may encrypt second data by using a hybrid encryption scheme through an application (e.g., the application 235 of FIG. 2) executed based on the second operating system 701-2. For example, the electronic device 701 may generate a session key and an IV for hybrid encryption, and may then generate an encryption message (TaMsg) corresponding to the second data by using the session key and the IV, the server nonce, and the second data (state or data).

In operation 918, the electronic device 701 may deliver, to the first operating system 701-1, the encryption message (TaMsg) corresponding to the second data generated based on the second operating system 701-2. For example, the electronic device 701 may deliver the encryption message (TaMsg) corresponding to the second data to a client (e.g., the client 234-1 of FIG. 2), which is based on the first operating system 701-1, by using an application (e.g., the application 235 of FIG. 2) which is based on the second operating system 701-2.

In operation 920, the electronic device 701 may deliver the encryption message (TaMsg) corresponding to the second data to the server 702 via a communication module based on the first operating system 701-1, and the server 702 may receive the encryption message (TaMsg) corresponding to the second data.

In operation 922, the server 702 may decrypt the encryption message (TaMsg) which corresponds to the second data and has been received from the electronic device 701, and thus may acquire the second data. According to various embodiments, the server 702 may identify a state of the electronic device 701 or data stored in the electronic device 701, by using the second data.

Each of the elements described in the disclosure may include one or more components, and the name of the corresponding element may vary depending on the type of electronic device. In various embodiments, an electronic device may include at least one of the elements described herein. Some of the elements may be omitted from the electronic device, or the electronic device may further include other additional elements. Further, some of the elements of the electronic device according to various embodiments may be combined to constitute a single entity, making it possible to equivalently perform functions of the corresponding elements before being combined.

The term "module" used in the disclosure may refer to, for example, a unit including one or a combination of two or more of hardware, software, or firmware. The term "module" may be used interchangeably with, for example, the term "unit", "logic", "logical block", "component", or "circuit". The "module" may be a minimum unit or a part of an integrally-configured component. The "module" may be a minimum unit performing one or more functions or a part thereof. The "module" may be implemented mechanically or electronically. For example, the "module" may include at least one of an Application-Specific Integrated Circuit (ASIC) chip, Field-Programmable Gate Arrays (FPGAs), or a programmable-logic device, all of which are known or to be developed in the future and perform certain operations.

At least some of devices (e.g., modules or functions thereof) or methods (e.g., operations) according to various embodiments may be implemented by an instruction which is stored in a computer-readable storage medium, for example, in the form of a program module. When the instruction is executed by a processor (e.g., the processor 120), the at least one processor may perform a function corresponding to the instruction. A computer-readable storage medium may be, for example, the memory 130.

According to various embodiments, a computer-readable recording medium may store a program configured to cause an electronic device to perform: receiving or transmitting data via communication with an external electronic device by using a communication module based on a first operating system; and processing the received data or data to be transmitted to the external electronic device by using a designated key based on a second operating system.

Examples of a computer-readable recording medium may include a hard disk, a floppy disk, a magnetic medium (e.g., a magnetic tape), an optical medium (e.g., a Compact Disc Read-Only Memory (CD-ROM) or a Digital Versatile Disc (DVD)), a magneto-optical medium (e.g., a floptical disk), a hardware device (e.g., a Read-Only Memory (ROM), a Random Access Memory (RAM), or a flash memory), and the like. Further, examples of program instructions may include high class language codes that can be executed by a computer by using an interpreter and the like, as well as machine language codes generated by a compiler. The above-described hardware device may be configured to operate as at least one software module so as to perform operations of various embodiments, and vice versa.

The module or program module according to various embodiments may include one or more of the above-described elements or may further include other additional elements, or some of the above-described elements may be omitted therefrom. The operations performed by the modules, the program modules, or other elements according to various embodiments may be performed in a sequential, parallel, repetitive, or heuristic manner. Further, some of the operations may be performed in another order or omitted, or other operations may be added thereto.

The above-described electronic device according to various embodiments of the disclosure is not limited by the above-described embodiments and the drawings. Further, it will be apparent to those having common knowledge in the technical field to which the disclosure pertains that various replacements, changes in form, and modifications may be made to the embodiments without departing from the technical scope of the disclosure.

What is claimed is:

1. An electronic device comprising:
   a communication module configured to perform wireless communication;
   a memory; and
   at least one processor configured to be electrically connected to the communication module and the memory,
   wherein the memory is configured to store instructions that, when executed, cause the at least one processor to:
   transmit, to an external electronic device by using the communication module based on a first operating system, initialization request message including unique information of the electronic device;
   receive, from the external electronic device by using the communication module based on a first operating system, an external electronic device nonce and authentication information of the external electronic device, and deliver, to a second operating system, the external electronic device nonce and the authentication information of the external electronic device;
   when the authentication information of the external electronic device is valid, generate an encryption message by using a session key and an initial vector for a hybrid encryption, a designated key, the external electronic device nonce, and an electronic device nonce, based on the second operating system;
   transmit, to the external electronic device by using the communication module based on the first operating system, the encryption message;
   receive, from the external electronic device by using the communication module based on the first operation system, notification information for notifying successful reception of the encryption message, and deliver, to the second operation system, the notification information;
   when the notification information is identified based on the second operation system, receive or transmit data via communication with the external electronic device by using the communication module based on the first operating system; and
   process the received data or data to be transmitted to the external electronic device by using the designated key based on the second operating system.

2. The electronic device of claim 1, wherein the designated key corresponds to a secret key, and the memory is configured to store the designated key in a storage area accessible only by the second operating system.

3. The electronic device of claim 1, wherein the memory comprises a Replay Protected Memory Block (RPMB), and the designated key is stored in the RPMB.

4. The electronic device of claim 2, wherein the memory is configured to further store instructions that, when executed, cause the at least one processor to:
   allow the second operating system to encrypt the designated key and deliver the encrypted designated key to the first operating system; and
   allow the first operating system to transmit the encrypted designated key to the external electronic device via the communication module.

5. The electronic device of claim 4, wherein the instructions are configured to cause the at least one processor to:
   when validity information, generated using the designated key, and first data are received from the external electronic device by using the communication module based on the first operating system,
   determine whether the first data is valid, by using the validity information based on the second operating system; and
   when the first data is valid, update data stored in the electronic device or a state of the electronic device based on the first data.

6. The electronic device of claim 5, wherein the validity information related to the first data corresponds to a token that the external electronic device generates based on the first data, the designated key, and a random value generated by the electronic device.

7. The electronic device of claim 5, wherein the validity information comprises a Hash-based Message Authentication Code (HMAC).

8. The electronic device of claim 5, wherein the first data comprises data for updating display data or a locked state of the electronic device.

9. The electronic device of claim 1, wherein the instructions are configured to cause the at least one processor to, when a request for transmission of second data is received from the external electronic device by using the communication module based on the first operating system, encrypt and provide the second data by using the designated key based on the second operating system.

10. A method for transmitting or receiving data based on a secure operating system in an electronic device, the method comprising:
transmitting, to an external electronic device by using a communication module based on a first operating system, initialization request message including unique information of the electronic device;
receiving, from the external electronic device by using the communication module based on a first operating system, an external electronic device nonce and authentication information of the external electronic device, and delivering, to a second operating system, the an external electronic device nonce and the authentication information of the external electronic device;
when the authentication information of the external electronic device is valid, generating an encryption message by using a session key and an initial vector for a hybrid encryption, a designated key, the external electronic device nonce, and an electronic device nonce, based on the second operating system;
transmitting, to the external electronic device by using the communication module based on the first operating system, the encryption message;
receiving, from the external electronic device by using the communication module based on the first operation system, notification information for notifying successful reception of the encryption message, and delivering, to the second operation system, the notification information;
when the notification information is identified based on the second operation system, receiving or transmitting data via communication with the external electronic device by using a communication module based on the first operating system; and
processing the received data or data to be transmitted to the external electronic device by using the designated key based on the second operating system.

11. The method of claim 10, wherein:
the designated key corresponds to a secret key;
the designated key is stored in a storage area accessible only by the second operating system; and
the storage area accessible only by the second operating system comprises a Replay Protected Memory Block (RPMB) accessible only by the second operating system.

12. The method of claim 11, further comprising
encrypting the designated key and delivering the encrypted designated key to the first operating system, by the second operating system, and
transmitting the encrypted designated key to the external electronic device via the communication module, by the first operating system,
wherein:
when validity information, generated using the designated key, and first data are received from the external electronic device by using the communication module based on the first operating system,
whether the first data is valid is determined using the designated key and the validity information based on the second operating system; and
when the first data is valid, data stored in the electronic device or a state of the electronic device is updated based on the first data.

13. The method of claim 12, wherein:
the validity information corresponds to a token that the external electronic device generates based on the first data, the designated key, and a random value generated by the electronic device; and
the first data comprises data for updating display data or a locked state of the electronic device.

14. A non-transitory computer-readable recording medium storing a program configured to cause an electronic device to perform:
transmitting, to an external electronic device by using a communication module based on a first operating system, initialization request message including unique information of the electronic device;
receiving, from the external electronic device by using the communication module based on a first operating system, an external electronic device nonce and authentication information of the external electronic device, and delivering, to a second operating system, the an external electronic device nonce and the authentication information of the external electronic device;
when the authentication information of the external electronic device is valid, generating an encryption message by using a session key and an initial vector for a hybrid encryption, a designated key, the external electronic device nonce, and an electronic device nonce, based on the second operating system;
transmitting, to the external electronic device by using the communication module based on the first operating system, the encryption message;
receiving, from the external electronic device by using the communication module based on the first operation system, notification information for notifying successful reception of the encryption message, and delivering, to the second operation system, the notification information;
when the notification information is identified based on the second operation system, receiving or transmitting data via communication with the external electronic device by using a communication module based on the first operating system; and
processing the received data or data to be transmitted to the external electronic device by using the designated key based on the second operating system.

* * * * *